United States Patent
Deng et al.

(10) Patent No.: US 9,832,736 B2
(45) Date of Patent: Nov. 28, 2017

(54) METHOD AND DEVICE FOR GAIN CONTROL OF ACTIVE DAS RELAY UNIT AND RELAY UNIT

(71) Applicant: COMBA TELECOM TECHNOLOGY (GUANGZHOU) CO., LTD., Guangdong (CN)

(72) Inventors: Hailong Deng, Guangdong (CN); Hui Zhang, Guangdong (CN); Song Cao, Guangdong (CN); Yuwen Zhang, Guangdong (CN)

(73) Assignee: COMBA TELECOM TECHNOLOGY (GUANGZHOU) CO., LTD., Guangdong (CN)

( * ) Notice: Subject to any disclaimer, the term of this patent is extended or adjusted under 35 U.S.C. 154(b) by 0 days.

(21) Appl. No.: 15/118,299

(22) PCT Filed: May 8, 2015

(86) PCT No.: PCT/CN2015/078568
§ 371 (c)(1),
(2) Date: Aug. 11, 2016

(87) PCT Pub. No.: WO2016/179750
PCT Pub. Date: Nov. 17, 2016

(65) Prior Publication Data
US 2017/0181103 A1   Jun. 22, 2017

(51) Int. Cl.
*H04W 52/18* (2009.01)

(52) U.S. Cl.
CPC .................................. *H04W 52/18* (2013.01)

(58) Field of Classification Search
CPC ... H04W 88/00; H04W 88/08; H04W 88/085; H04W 52/18; H04B 7/02
USPC ....................... 455/561, 562.1, 522; 370/318
See application file for complete search history.

(56) References Cited

U.S. PATENT DOCUMENTS

2015/0145528 A1* 5/2015 Yeo ........................ G01R 29/10
324/629

* cited by examiner

*Primary Examiner* — Raymond Dean
(74) *Attorney, Agent, or Firm* — Shami Messinger PLLC; Khaled Shami

(57) ABSTRACT

A method for gain control of an active DAS relay unit is disclosed, including: acquiring a downlink output power value of a remote unit accessing the active DAS, and acquiring an uplink maximum gain value of a relay unit of the active DAS; obtaining an attenuation adjustment value required to be set for an uplink where the remote unit is, based on a combination of the downlink output power value and the uplink maximum gain value; and setting an adjustable attenuator arranged in the uplink based on the attenuation adjustment value. A device for gain control of an active DAS relay unit and a relay unit are also disclosed. The present disclosure may be compatible with remote units with different power levels, simplify the complexity of the design of the coverage scheme, increase the flexibility of the network construction, and reduce the cost of the network construction.

4 Claims, 4 Drawing Sheets

METHOD AND DEVICE FOR GAIN CONTROL OF ACTIVE DAS RELAY UNIT AND RELAY UNIT

CROSS-REFERENCE TO RELATED APPLICATIONS

This application is the U.S. national phase of International Patent Application No. PCT/CN2015/078568, filed May 8, 2015, the contents of which are incorporated herein by reference in their entirety.

FIELD

The present disclosure relates generally to the field of mobile communication, and more particularly, to a method and device for gain control of an active DAS relay unit, and a relay unit.

BACKGROUND

With the rapid development of network construction and client application requirements of the mobile communication, the coverage and quality requirements of mobile communication signals are increasingly growing and the active Distributed Antenna System (hereafter referred to as DAS) has gradually become a preferable scheme for achieving high quality in-depth coverage. In order to meet different coverage conditions, DASs with different powers have become quite common (by hybrid networking for coverage).

When an active DAS is designed and developed, considering that the variation of device power levels, the rise in the uplink noise floor and the balance between receiving sensitivity and coverage area for a respective device, it is quite different in the gain of the active DAS and the distribution of the internal gain of the system (especially in uplink). As a result, a relay unit of one type of DAS may only be accessible for a remote unit of one power level, that is, it does not allow remote units with different power levels to access a single type of relay unit in compatibility. Therefore, the design of the coverage scheme is complicated, with high cost of the network construction.

SUMMARY

In view of the above technical problems in the prior art, it is an objective of the present disclosure to provide a method and device for gain control of a relay unit in an active DAS system, and a relay unit, which may be compatible with remote units of different power levels, simplify the complexity of the design of the coverage scheme, increase the flexibility of the network construction, and reduce the cost of the network construction.

The objective of the present disclosure is achieved by the following technical solutions.

According to an aspect of the present disclosure, a method for gain control of an active DAS relay unit is provided, including the following steps:

acquiring a downlink output power value of a remote unit accessing the active DAS, and acquiring an uplink maximum gain value of a relay unit of the active DAS;

obtaining an attenuation adjustment value required to be set for an uplink where the remote unit is, based on a combination of the downlink output power value and the uplink maximum gain value; and setting an adjustable attenuator arranged in the uplink based on the attenuation adjustment value.

According to another aspect of the present disclosure, a device for gain control of an active DAS relay unit is provided, including:

an acquiring module, configured to acquire a downlink output power value of a remote unit accessing the active DAS, and acquire an uplink maximum gain value of a relay unit of the active DAS;

a processing module, configured to obtain an attenuation adjustment value required to be set for an uplink where the remote unit is, based on a combination of the downlink output power value and the uplink maximum gain value; and a control module, configured to set an adjustable attenuator arranged in the uplink based on the attenuation adjustment value.

According to a further aspect of the present disclosure, a relay unit is provided, including the above device for gain control of the active DAS relay unit.

The solution according to the present disclosure can acquire a downlink output power value of a remote unit accessing the active DAS, and acquire an uplink maximum gain value of a relay unit of the active DAS, obtain an attenuation adjustment value required to be set for an uplink where the remote unit is based on a combination of the downlink output power value and the uplink maximum gain value, and set the adjustable attenuator arranged in the uplink based on the attenuation adjustment value. The adjustable attenuator in the corresponding uplink is set based on the downlink output power value of the remote unit, and each uplink can set the adjustable attenuator in the corresponding uplink in accordance with the present disclosure, so the gains of the uplinks where the remote units with different downlink output power values are located are different. This may achieve the compatibility for the remote units with different power levels, simplify the complexity of the design of the coverage scheme, increase the flexibility of the network construction, and reduce the cost of the network construction.

DETAILED DESCRIPTION OF THE PREFERRED EMBODIMENTS

Purposes, technical solutions, and advantages according to the present disclosure may be understood by reference to the following description of the preferred embodiments taken in conjunction with the accompanying drawings. It is to be understood that the specific implements described herein tend to explain the present disclosure not to limit the scope of the present disclosure.

In the following description, embodiments of the method for gain control of an active DAS relay unit are illuminated at first, then embodiments of the device for gain control of an active DAS relay unit are illuminated, and embodiments of the relay unit according to the present disclosure are illuminated finally.

Figure 1:
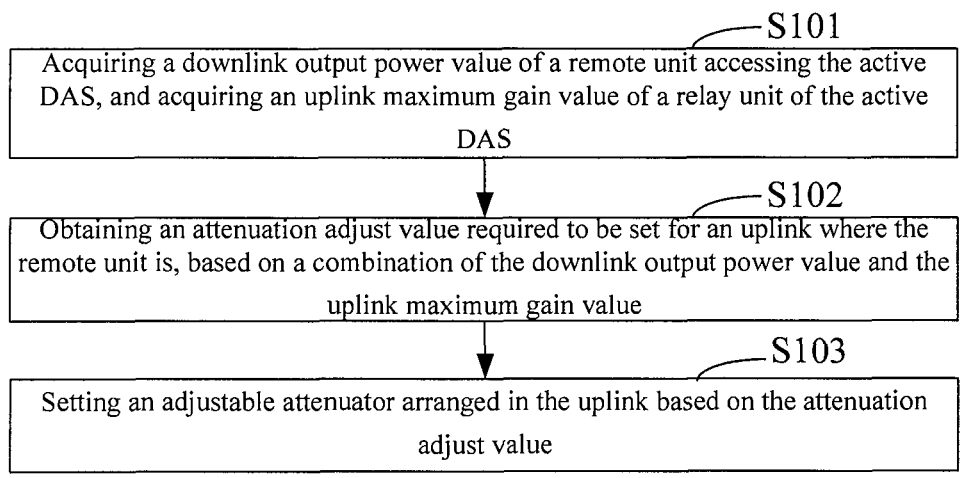
FIG. 1 is a flow diagram illuminating a method for gain control of an active DAS relay unit according to one embodiment of the present disclosure.

Refer to FIG. 1, which is a flow diagram illuminating a method for gain control of an active DAS relay unit according to one embodiment of the present disclosure. As shown in FIG. 1, the method for gain control of the active DAS relay unit in this embodiment may include the following steps.

Step S101, acquiring a downlink output power value of a remote unit accessing the active DAS, and acquiring an uplink maximum gain value of a relay unit of the active DAS.

In this embodiment, the remote unit accessing the active DAS may be generally coupled to a relay unit of the active DAS through an optical interface. The optical interface may generally refer to a fiber Interface.

The downlink output power value is consistent with the power level explained in the background art in this embodiment.

In one embodiment, the acquiring the downlink output power value of the remote unit accessing the active DAS may include: sending a power query instruction to the remote unit, based on an ID (Identity) of an optical interface of the remote unit; and receiving the downlink output power value returned from the remote unit based on the power query instruction.

The ID of the optical interface of the remote unit may be acquired based on the communication protocol between the remote unit and the relay unit. Different remote units have different IDs. The power query instruction may be sent to the remote unit corresponding to the ID by means of the ID. The remote unit may return the downlink output power value to the relay unit after receiving the power query instruction.

The uplink maximum gain value in this embodiment is a preset constant value which may be set by taking communication specification, stray loss and other factors into account. The uplink maximum gain value may be required to be greater than the maximum value of the uplink gain of any one remote unit planed to access the active DAS.

Step S102, obtaining an attenuation adjustment value required to be set for an uplink where the remote unit is, based on a combination of the downlink output power value and the uplink maximum gain value.

In one embodiment, the way of obtaining the attenuation adjustment value may include: querying for a relay unit uplink gain corresponding to the downlink output power value in a pre-created look-up table based on the downlink output power value; calculating a difference between the uplink maximum gain value and the relay unit uplink gain as the attenuation adjustment value.

The look-up table may show corresponding relationships between the downlink output power value and the relay unit uplink gain. Table 1 illustrates a look-up table in which the number and values of the downlink output power values, and the relay unit uplink gains corresponding to the downlink output power values may be set as needed. The look-up table may be set according to the specific configuration information of the remote unit and the relay unit.

TABLE 1

Look-up Table for Downlink Output Power Value and Relay unit Uplink Gain

| Downlink Output Power Value | Relay unit Uplink Gain |
|---|---|
| P1 | Gain1 |
| P2 | Gain2 |
| P3 | Gain3 |
| P4 | Gain4 |

Step S103, setting an adjustable attenuator arranged in the uplink based on the attenuation adjustment value.

The setting the adjustable attenuator arranged in the uplink based on the attenuation adjustment value means the attenuation value of the adjustable attenuator arranged in the corresponding uplink is adjusted to the attenuation adjustment value.

The solution according to the present disclosure can acquire a downlink output power value of a remote unit accessing the active DAS, and acquire an uplink maximum gain value of a relay unit of the active DAS, obtain an attenuation adjustment value required to be set for an uplink where the remote unit is based on a combination of the downlink output power value and the uplink maximum gain value, and set the adjustable attenuator arranged in the uplink based on the attenuation adjustment value. The adjustable attenuator in the corresponding uplink is set based on the downlink output power value of the remote unit, and each uplink can set the adjustable attenuator in the corresponding uplink in accordance with the present disclosure, so the gains of the uplinks where the remote units with different downlink output power values are located are different. This may achieve the compatibility for the remote units with different power levels, simplify the complexity of the design of the coverage scheme, increase the flexibility of the network construction, and reduce the cost of the network construction.

Figure 2:
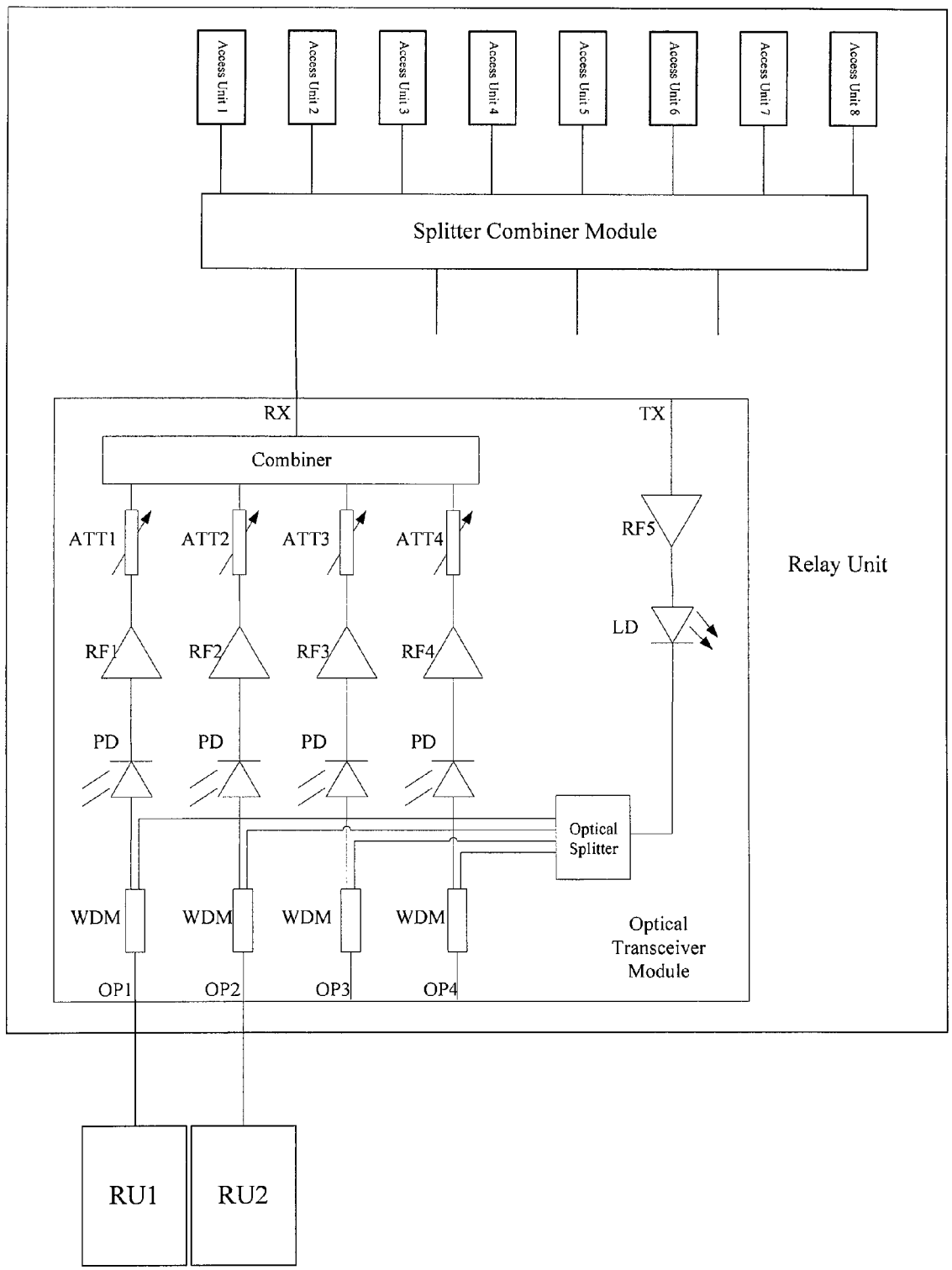
FIG. 2 is a schematic diagram illustrating a traditional active DAS.

Refer to FIG. 2, which is a schematic diagram illustrating a traditional active DAS. As shown in FIG. 2, the light reception of the relay unit in the active DAS is independent from that of the respective remote unit. The receiving end of the optical transceiver module has separate radio-frequency amplifiers RF1~RF4 and adjustable attenuators ATT1~ATT4. It is quite complex in the design of the coverage scheme since that it does not allow remote units with different power levels to access the relay unit in compatibility. In FIG. 2, the unit signed as "PD" refers to a photo-detector, the unit signed as "WDM" refers to a wavelength division multiplexer, the unit signed as "LD" refers to a laser device, the units signed as "OP1"~"OP4" refer to four different optical interfaces, and the unit signed as "RF5" refers to a radio-frequency amplifier.

Referring to FIG. 2, two remote units (RU1 and RU2) with different power levels are illuminated to access the relay unit, in which the RU1 is a remote unit with great power, and the RU2 is a remote unit with low power (that is, the downlink output power value of the RU1 is greater than that of the RU2).

The uplink maximum gain value of the relay unit of the active DAS is designed as Gain1. The uplink gain of the relay unit of the active DAS is designed as Gain2 when the remote unit RU1 with great power accesses. The uplink gain of the relay unit of the active DAS is designed as Gain3 when the remote unit RU2 with low power accesses. Gain1≥Gain2 and Gain1≥Gain3.

When the remote unit RU1 with great power accesses the relay unit, the relay unit may find the downlink output power value of the remote unit RU1 through a built-in communication channel, and find that the relay unit gain corresponding to the downlink output power value is Gain2 by looking up the look-up table (provided that the corresponding relationship of the downlink output power value of the remote unit RU1 and the Gain2 has been listed in the look-up table). Then, the attenuation adjustment value required to be set in the uplink of the relay unit is calculated as Att1=Gain1−Gain2. The value of Att1 may be transmitted by the relay unit to the optical transceiver module for setting the adjustable attenuator ATT1.

When the remote unit RU2 with low power accesses the relay unit, the relay unit may find the downlink output power value of the remote unit RU2 through a built-in communication channel, and find that the relay unit gain corresponding to the downlink output power value is Gain3 by looking up the look-up table (provided that the corresponding relationship of the downlink output power value of the remote unit RU2 and the Gain3 has been listed in the look-up table). Then, the attenuation adjustment value required to be set in the uplink of the relay unit is calculated as Att2=Gain1−Gain3. The value of Att2 may be transmitted by the relay unit to the optical transceiver module for setting the adjustable attenuator ATT2.

In the above descriptions, the uplink maximum gain value is constant (which is Gain1) for different uplinks. In this way, the calculation can be simplified, and the control efficiency can be improved. It should be noted that, the implement is not limited to the uplink maximum gain value being constant for different uplinks, and the different uplinks may be set to have different uplink maximum gain values as needed, such that the uplink maximum gain value should correspond to the uplink when calculating the attenuation adjustment value.

Overall, the relay unit can automatically acquire the downlink output power values of the remote units respectively, and automatically and independently set the gain of the different uplinks where the remote units with different downlink output power values access respectively, so it is compatible with the remote units of different power levels to access.

Figure 3:
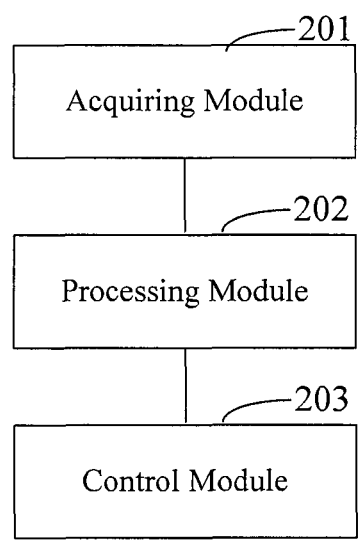
FIG. 3 is a schematic diagram illustrating a device for gain control of an active DAS relay unit according to one embodiment of the present disclosure.

According to the above method for gain control of an active DAS relay unit of the present disclosure, a device for gain control of an active DAS relay unit is further provided. Embodiments of the device for gain control of an active DAS relay unit according to the present disclosure are detailed in the following description. FIG. 3 show a schematic diagram illustrating a device for gain control of an active DAS relay unit a device for gain control of an active DAS relay unit. For illustration purposes, only some portions related to the present disclosure are shown.

As shown in FIG. 3, the device for gain control of an active DAS relay unit in this embodiment includes an acquiring module 201, a processing module 202 and a control module 203.

The acquiring module 201 is configured to acquire a downlink output power value of a remote unit accessing the active DAS, and acquire an uplink maximum gain value of a relay unit of the active DAS;

the processing module 202 is configured to obtain an attenuation adjustment value required to be set for an uplink where the remote unit is, based on a combination of the downlink output power value and the uplink maximum gain value; and the control module 203 is configured to set an adjustable attenuator arranged in the uplink based on the attenuation adjustment value.

In one embodiment, the acquiring module 201 may be further configured to send a power query instruction to the remote unit, based on an ID of an optical interface of the remote unit, and receive the downlink output power value returned from the remote unit based on the power query instruction.

In one embodiment, the processing module 202 may be further configured to query for a relay unit uplink gain corresponding to the downlink output power value in a pre-created look-up table based on the downlink output power value, and calculate a difference between the uplink maximum gain value and the relay unit uplink gain as the attenuation adjustment value.

In one embodiment, the uplink maximum gain value is constant for different uplinks.

The device for gain control of the active DAS relay unit according to the present disclosure corresponds to the method for gain control of the active DAS relay unit according to the present disclosure. The technical features and beneficial effects illuminated in the above embodiments of the method for gain control of the active DAS relay unit are applied to the embodiments of the device for gain control of the active DAS relay unit.

Figure 4:
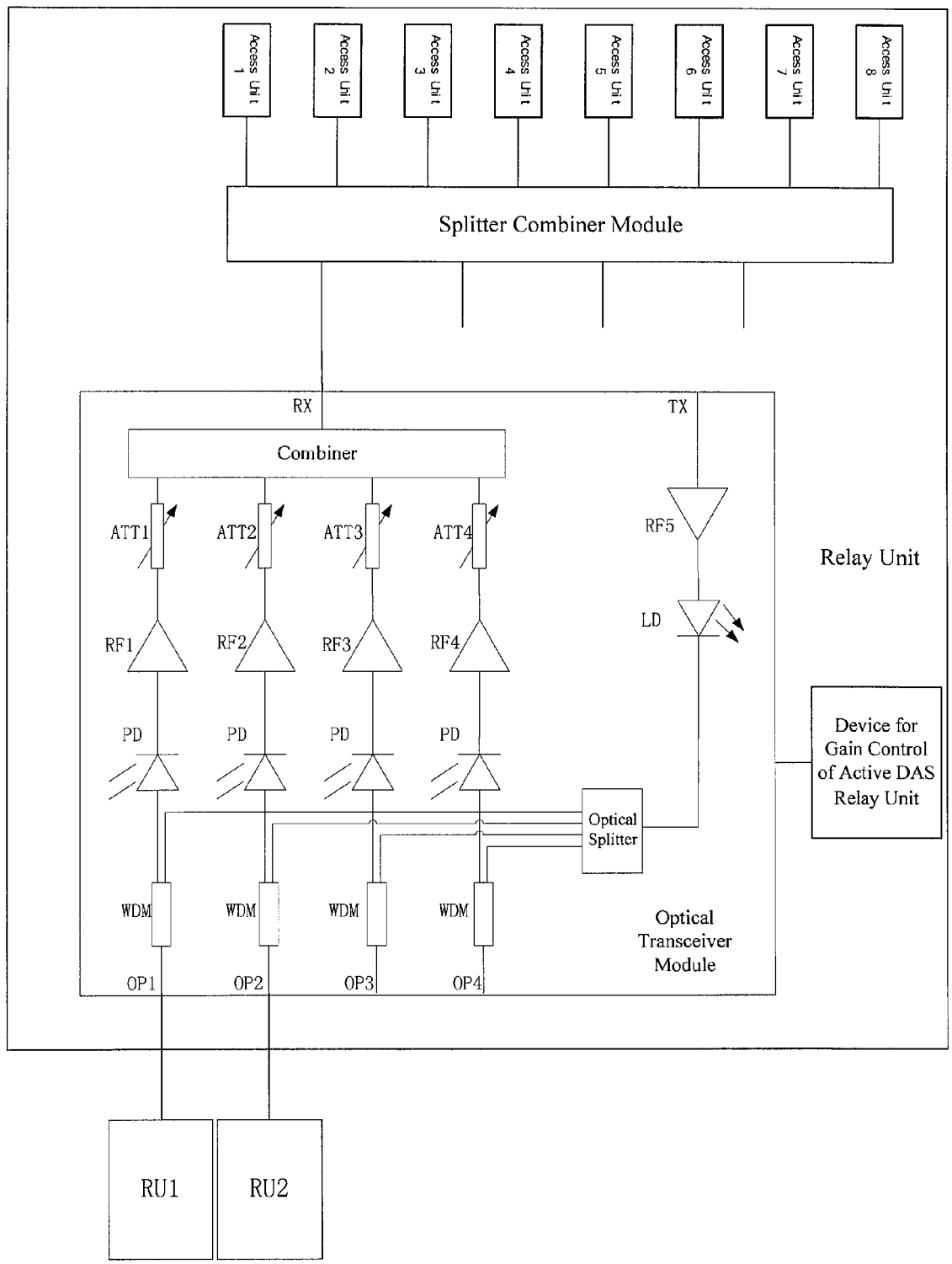
FIG. 4 is a schematic diagram illustrating an active DAS in which a relay unit including a device for gain control of an active DAS relay unit is applied according to one embodiment of the present disclosure.

In addition, according to the device for gain control of the active DAS relay unit of the present disclosure, a relay unit is further provided, including the above device for gain control of the active DAS relay unit. As shown in FIG. 4, it is a schematic diagram illustrating an active DAS in which a relay unit including the device for gain control of the active DAS relay unit is applied. The way of automatic gain adjustment for respective uplinks by the relay unit may be performed as above, and it needs not be repeated here.

The above are embodiments of the disclosure described in detail, and should not be deemed as limitations to the scope of the present disclosure. It should be noted that variations and improvements will become apparent to those skilled in the art to which the present disclosure pertains without departing from its spirit and scope. Therefore, the scope of the present disclosure is defined by the appended claims.

The invention claimed is:

1. A method for gain control of a relay of an active distributed antenna system (DAS), comprising:
    acquiring a downlink output power value of a remote unit accessing the active DAS, and acquiring an uplink maximum gain value of the relay unit of the active DAS;
    obtaining an attenuation adjustment value required to be set for an uplink where the remote unit is, based on a combination of the downlink output power value and the uplink maximum gain value; and
    setting an adjustable attenuator arranged in the uplink based on the attenuation adjustment value.

2. The method of claim 1, wherein the acquiring the downlink output power value of the remote unit accessing the active DAS includes:
    sending a power query instruction to the remote unit, based on an ID of an optical interface of the remote unit; and
    receiving the downlink output power value returned from the remote unit based on the power query instruction.

3. The method of claim 1, wherein the obtaining the attenuation adjustment value required to be set for the uplink where the remote unit is, based on the combination of the downlink output power value and the uplink maximum gain value includes:
    querying for a relay unit uplink gain corresponding to the downlink output power value in a pre-created look-up table based on the downlink output power value; and
    calculating a difference between the uplink maximum gain value and the relay unit uplink gain as the attenuation adjustment value.

4. The method of claim 1, wherein the uplink maximum gain value is constant for different uplinks.

* * * * *